United States Patent [19]

Goring

[11] Patent Number: 4,507,441
[45] Date of Patent: Mar. 26, 1985

[54] ACCELERATORS FOR THE CURE OF EPOXY RESINS

[75] Inventor: John O. Goring, Kettering, England

[73] Assignee: Scott Bader Company Limited, Wollaston, England

[21] Appl. No.: 608,572

[22] Filed: May 9, 1984

[30] Foreign Application Priority Data

May 16, 1983 [GB] United Kingdom ................. 8313482
Feb. 2, 1984 [GB] United Kingdom ................. 8402823

[51] Int. Cl.$^3$ .................... C08G 59/68; C08G 59/42
[52] U.S. Cl. .................................. 525/438; 525/504; 525/533; 525/934; 528/94; 528/113; 528/365
[58] Field of Search ...................... 528/94, 113, 365; 525/438, 504, 533

[56] References Cited

U.S. PATENT DOCUMENTS

| 3,329,652 | 7/1967 | Christie | 528/94 |
| 3,394,105 | 7/1968 | Christie | 528/94 |
| 4,069,203 | 1/1978 | Carey et al. | 528/94 |
| 4,379,909 | 4/1983 | Falkenberg et al. | 528/94 |

Primary Examiner—Earl A. Nielsen
Attorney, Agent, or Firm—Cushman, Darby & Cushman

[57] ABSTRACT

A compound containing an epoxy group, is reacted with a carboxyl compound by heating a mixture of these compounds in the presence of a benzotriazole such as unsubstituted benzotriazole or tolyltriazole as accelerator. The accelerator is particularly effective in the reaction of a carboxyl compound which is a polyester containing free carboxylic acid groups with an epoxy compound which is triglycidyl cyanurate or an epoxy resin based on bisphenol A.

10 Claims, 1 Drawing Figure

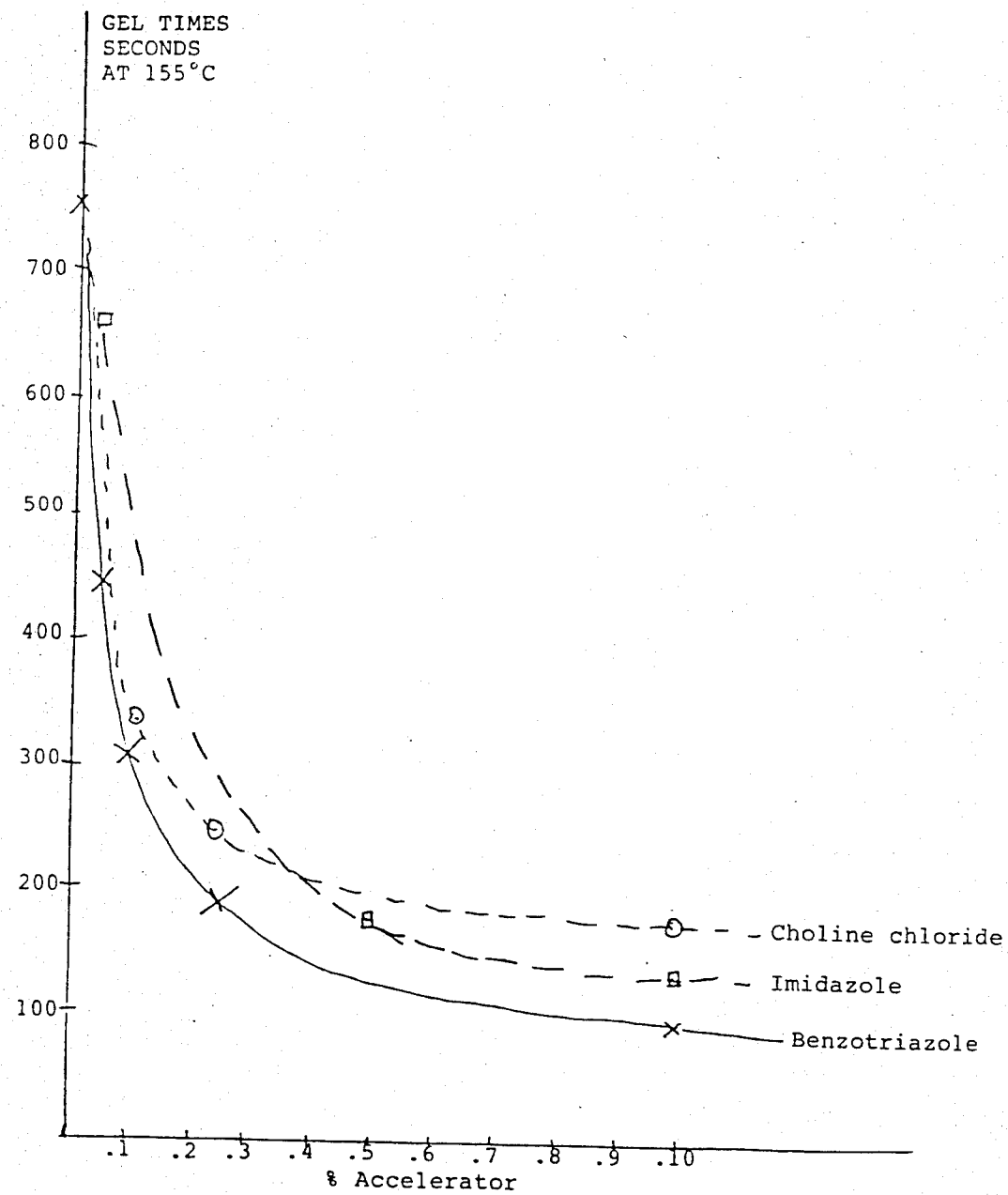

ACCELERATORS FOR THE CURE OF EPOXY RESINS

Epoxy resins can be cured by acid anhydrides and the application of heat. Typical of the anhydrides used are those of phthalic, hexahydrophthalic, succinic, dodecenyl succinic, maleic, the adduct of methyl cyclopentadiene and maleic, methyl tetrahydrophthalic and trimellitic acid and 3,3′, 4,4′-benzophenone tetracarboxylic dianhydride. The anhydride ring must open for cure to occur and this can be accelerated or caused to happen at lower temperatures by the addition of small quantities of proton containing compounds e.g. amines. Typical conventional cure accelerators used in epoxy/anhydride systems are benzyldimethylamine, 2,4,6,-tris(-dimethylaminomethyl)phenol, 2-ethyl-4-methylimidazole

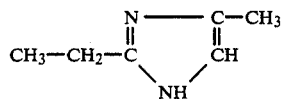

and stannous octoate.

Epoxy resin will also react with carboxylic acids at elevated temperature and this fact is made use of in powder coatings where solid epoxy resins are mixed with solid polyester resins which contain free carboxyl groups either at the ends of chains or on side chains and heated to effect cure. In this application accelerators are often used and amongst those described in the literature are choline chloride (EP-A-0010805) and heterocyclics e.g. imidazole and 2-methylimidazole (GB 1516077 and GB 1558303).

We now find that benzotriazoles including those with aromatic ring substitution behave as cure accelerators or catalysts for the reaction between compounds containing epoxy groups and carboxylic acid compounds, such as compounds which are in the form of polyesters with free carboxyl groups at the ends of chains or on branched chains.

Preferably, such benzotriazoles have the formula:

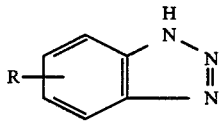

where R is absent or is lower alkyl such as $C_{1-4}$ alkyl, e.g. $CH_3$.

The group R may assume any position on the benzene nucleus, and a mixture of isomers may be used.

In particular excellent powder coatings can be obtained from epoxide resins based on bisphenol A such as Epikote ® 1055 or Araldite ® GT 7004 or epoxy-containing compounds such as triglycidyl isocyanurate (e.g. Araldite ® PT 810). Other types of epoxy resins can be used e.g. those based on novolaks having e.g. a melting point above 50° C.

Typical polyester resins that can be used are those based on a symmetrical glycol e.g. neopentyl glycol and one or more aromatic dicarboxylic acids e.g. isophthalic acid or terephthalic acid, the acid content optionally additionally being provided by an aliphatic mono or dicarboxylic acid e.g. pelargonic acid, adipic acid or trimellitic anhydride. The polyester should preferably have an acid value of 30–100 mg KOH/g, a melting point of 50°–70° C. and a melt viscosity of 10–14 poise at 200° C. (as measured using an I.C.I. Cone and Plate Viscometer).

The powder coatings can include in addition to epoxy, polyester and cure accelerator, pigments to obtain the desired colour, flow control agents and light stabilisers.

Preferred reactions embodying the invention will now be described with reference to the following Examples, which include a comparison between the performance of an accelerator used in a reaction embodying the invention and reactions carried out with conventional accelerators.

EXAMPLE I

A polyester was prepared from 5.3 mole neopentyl glycol and 4.3 mole terephthalic acid reacted at 200°–240° C. to an acid value less than 10 mg KOH/g. 1 mole of trimellitic anhydride was added and further reaction carried out at 190°–200° C. until an acid value of 80–90 mg KOH/g was reached. On cooling, a solid resin was obtained which could be easily powdered.

A series of powder coatings were made using:

| | |
|---|---|
| polyester resin (as above) | 100 pbw |
| Epikote ® 1055 (solid epoxide resin) | 100 pbw |
| titanium dioxide (pigment) | 100 pbw |
| benzoin (light stabiliser) | 2 pbw |
| Modaflow ® (flow control agent) | 2 pbw |
| Cure accelerator* | 0–1.0 pbw |

*(a) choline chloride
(b) imidazole
(c) benzotriazole

After dry blending, the constituents were passed through an extruder at 100° C. and ground to a powder. Gel times of the various formulations were determined at 155° C. using the "stroke gel time" on a hot plate (B.S. 2782 Method 835D: 1980). The results, shown in FIG. 1, indicate that benzotriazole is a cure accelerator and that it is even more efficient than choline or imidazole.

EXAMPLE II

| | |
|---|---|
| neopentyl glycol | 364 g |
| terephthalic acid | 423 g |
| adipic acid | 41 g |
| Fascat ® 4201 (esterification catalyst) | 3 g |
| Water | 28 g | to a temperature of 200°–240° C. until an acid value of below 10 mg KOH/g was obtained. The water was present to allow a slurry to be formed so that the reaction mixture could be stirred. 141 g of trimellitic anhydride was then added and further condensation carried out until an acid value of 80±5 mg KOH/g had been reached.

The solid polyester had a melting point of 57° C. and a melt viscosity of approximately 20 p at 200° C.

A powder coating was prepared from the above resin by powdering and dry blending the following materials:

| | |
|---|---|
| Polyester resin (as above) | 100 pbw |

-continued

| | |
|---|---|
| Araldite ® GT 7004 (epoxy resin) | 100 pbw |
| Kronos ® CL310 (titanium dioxide pigment) | 100 pbw |
| Benzoin | 2 pbw |
| Modaflow ® | 2 pbw |
| Cure accelerator | 0–1.0 pbw |

The mixture was then extruded at a melt temperature of 120°–125° C. and the cooled product ground to give a powder paint with a particle size of below 100μ. It can be electrostatically sprayed and cured at a temperature of 200° C. for 10 minutes.

It is desirable to reduce the temperature and duration of cure to save energy costs and this can be done by incorporating a cure accelerator. The stroke gel time is a measure of the time needed to cure. The results are shown in Table I.

TABLE I

| Stroke Gel times of Powder Coatings | | |
|---|---|---|
| Cure Accelerator & Level (pbw) | Gel Time (secs) at 155° C. | Gel Time (secs) at 100° C. |
| Choline Chloride 0 | 1240 | 600 |
| 0.025 | 825 | 380 |
| 0.25 | 300 | 112 |
| 0.75 | 225 | 85 |
| Imidazole 0 | 1240 | 600 |
| 0.025 | 825 | 450 |
| 0.25 | 300 | 160 |
| 0.75 | 225 | 90 |
| Benzotriazole 0 | 1240 | 600 |
| 0.025 | 600 | 300 |
| 0.25 | 250 | 110 |
| 0.75 | 173 | 80 |

These figures again show the greater efficiency of benzotriazole as a cure accelerator as compared with the conventional accelerators choline chloride and imidazole.

EXAMPLE III

A polyester resin was prepared by condensing the following at 200°–240° C. until an acid value below 20 mg KOH/g was obtained.

| | |
|---|---|
| Neopentyl glycol | 530 g |
| Terephthalic acid | 711 g |
| Isophthalic acid | 88 g |
| Pelargonic acid | 58 g |
| Fascat ® 4201 | 5 g |
| Water | 30 g |

42.6 g of trimellitic anhydride were then added and the reaction continued to an acid value of 35±5 mg KOH/g.

Mixtures of 90 pbw of the above polyester, 10 pbw Araldite ® PT810 (triglycidyl isocyanurate), 50 pbw titanium dioxide pigment, 1 pbw flow control agent and 0, 0.1% and 0.3% benzotriazole were made, extruded and powdered.

The stroke gel times of these combinations are shown in Table II.

TABLE II

| | Gel Time (secs) | |
|---|---|---|
| Benzotriazole (%) | 155° C. | 180° C. |
| 0 | 600 | 200 |
| 0.1 | 260 | 190 |
| 0.3 | 200 | 90 |

EXAMPLE IV

A polyester resin was prepared by heating:

| | |
|---|---|
| neopentyl glycol | 364 g |
| terephthalic acid | 423 g |
| adipic acid | 41 g |
| Fascat ® 4201/esterification catalyst | 3 g |
| Water | 28 g | to a temperature of 200°–240° C. until an acid value below 10 mg KOH/g was obtained. The water was present to allow a slurry to be formed so that the reaction mixture could be stirred. 141 g of trimellitic anhydride was then added and further condensation carried out until an acid value of 80±5 mg KOH/g had been reached.

The resin was mixed with an equal quantity of Araldite ® GT 7004 epoxy resin and powdered.

To two portions of this mixture 0.5% by weight of tolyltriazole (Sandoz TT-100) and benzotriazole were respectively added. Gel times were determined at 155° C. and 180° C. using the stroke gel time on a hot plate (B.S. 2782: Method 835D).

| | | Gel Time in Seconds | |
|---|---|---|---|
| | | 180° C. | 155° C. |
| 4A | No additive | 125 | 250 |
| 4B | Tolyltriazole | 51 | 135 |
| 4C | Benzotriazole | 59 | 124 |

It can be seen that the gel time is greatly reduced when using benzotriazole or tolyltriazole in a reaction in accordance with the invention as cure accelerator.

What is claimed is:

1. A method of reacting a compound containing an epoxy group with a carboxylic acid compound which comprises heating a mixture of the compound containing an epoxy group and the carboxylic acid compound in the presence of an accelerator characterized in that the accelerator is a benzotriazole optionally substituted in the aromatic ring.

2. A method according to claim 1, wherein the benzotriazole has the formula

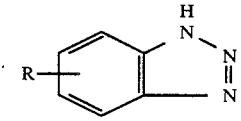

where R is absent or is $C_{1-4}$ alkyl.

3. A method according to claim 2, wherein the benzotriazole is unsubstituted benzotriazole or tolyltriazole.

4. A method according to claim 1, wherein the carboxylic acid compound is a polyester containing free carboxyl groups.

5. A method according to claim 4, wherein the compound containing an epoxy group is an epoxy resin.

6. A method according to claim 5, wherein the epoxy resin is based on bisphenol A.

7. A method according to claim 4, wherein the compound containing an epoxy group is triglycidyl isocyanurate.

8. A method according to claim 4, wherein the polyester includes glycol units derived from neopentyl glycol and acid units derived from one or more of terephthalic and isophthalic acids, the acid residues optionally additionally including units derived from another, mono- or di,-carboxylic acid.

9. A method of reacting a compound containing an epoxy group with a carboxylic acid compound which comprises heating a mixture of the compound containing an epoxy group and the carboxylic acid compound in the presence of an accelerator, the improvement consisting of the use, as accelerator, of a benzotriazole optionally substituted in the aromatic ring.

10. A method according to claim 9, wherein the compound containing an epoxy group is an epoxy resin and the carboxylic acid compound is a polyester containing free carboxyl groups.

* * * * *